United States Patent
Kitajima

(10) Patent No.: US 6,768,280 B2
(45) Date of Patent: Jul. 27, 2004

(54) MOTOR CONTROL APPARATUS

(75) Inventor: Yasuhiko Kitajima, Kamakura (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/179,973

(22) Filed: Jun. 26, 2002

(65) Prior Publication Data

US 2003/0001536 A1 Jan. 2, 2003

(30) Foreign Application Priority Data

Jun. 29, 2001 (JP) ........................................ 2001-198691

(51) Int. Cl.⁷ .......................... H02P 7/00; H02K 17/32; G05F 1/455; H02M 1/12
(52) U.S. Cl. ...................... 318/432; 318/434; 323/246; 323/312; 363/45; 363/39
(58) Field of Search ................................ 318/432, 806, 318/433, 434, 689, 635, 720–724, 798–811; 323/204, 246, 274–281, 312, 348; 363/45, 46, 39

(56) References Cited

U.S. PATENT DOCUMENTS

| | | | |
|---|---|---|---|
| 5,023,924 A | * | 6/1991 | Tajima et al. ............... 388/811 |
| 5,047,909 A | * | 9/1991 | Hosoda ....................... 363/40 |
| 5,272,429 A | * | 12/1993 | Lipo et al. ................... 318/808 |
| 5,334,923 A | * | 8/1994 | Lorenz et al. .............. 318/805 |
| 5,714,857 A | * | 2/1998 | Mannel et al. .............. 318/432 |
| 2002/0097015 A1 | * | 7/2002 | Kitajima et al. ............ 318/432 |

FOREIGN PATENT DOCUMENTS

| JP | 56038987 A | * | 4/1981 | ............. H02P/6/02 |
|---|---|---|---|---|
| JP | 8-331885 | | 12/1996 | ............. H02P/6/10 |

* cited by examiner

*Primary Examiner*—Robert Nappi
*Assistant Examiner*—Edgardo San Martin
(74) *Attorney, Agent, or Firm*—McDermott Will & Emery LLP

(57) ABSTRACT

A motor control apparatus includes a fundamental wave current control system that controls a fundamental wave component of a motor current in an orthogonal coordinate system and a higher harmonic current control system that controls a higher harmonic component contained in the motor current in an orthogonal coordinate system. In the motor control apparatus, it is judged whether an output voltage from the power conversion device is in a saturated state, and a current control gain for the higher harmonic current control system is reduced if it is judged that the output voltage is in the saturated state.

9 Claims, 15 Drawing Sheets

MAGNET

MAGNET

MOTOR CONTROL APPARATUS

The disclosure of the following priority application is herein incorporated by reference; Japanese Patent Application No. 2001-198691 filed Jun. 29, 2001.

BACKGROUND OF THE INVENTION

1. Field of the Invention

The present invention relates to an apparatus that implements drive control on an AC motor and, more specifically, relates to an apparatus that reduces the higher harmonic current flowing to a 3-phase AC motor.

2. Description of the Related Art

The control calculation is normally executed in a current control circuit for a 3-phase AC motor by converting the physical quantity of a 3-phase AC which necessitates a complicated handling procedure to a direct current physical quantity in order to facilitate the calculation (see Japanese Laid-Open Patent Publication No. H 08-331885).

FIG. 14 shows the structure of a standard 3-phase AC motor control apparatus which is commonly utilized. In the control calculation executed in this motor control apparatus, a rotating orthogonal coordinate system (a dq coordinate system) having a d-axis representing the direction of the magnetic flux in the 3-phase AC motor and a q-axis extending perpendicular to the d-axis is used. The current control calculation is performed using a direct current value obtained by converting the 3-phase AC value in the rotating orthogonal coordinate system to reduce the current control deviation.

Miniaturization and higher efficiency are often achieved with regard to an AC motor today by providing a rotor having internally embedded magnets, as shown in FIG. 15, and a stator assuming a concentrated winding structure. The rotor is able to effectively utilize the magnetic torque and the reluctance torque. A motor having a rotor adopting this structure is called an IPM (interior permanent magnet motor). The stator is capable of greatly reducing the coil end. A motor provided with the rotor and the stator having the structures described above, which is called a concentrated winding IPM motor, has been attracting a great deal of interest as a motor capable of realizing miniaturization and a high order of efficiency.

While the concentrated winding IPM motor described above allows miniaturization and achieves higher efficiency, it is characterized in that significant spatial harmonics manifest. The spatial harmonics in a motor assuming a concentrated winding structure become significant because the small number of slots at each pole results in a more uneven distribution of the magnetic flux compared to that in a motor assuming a distributed winding structure. An explanation is given below as to why a uniform magnetic flux distribution cannot be achieved.

FIG. 16 shows an SPM motor assuming a surface magnet structure achieved by covering the surface of the rotor with magnets. Unlike in the SPM motor shown in FIG. 16, areas where magnets are embedded and areas where no magnet is embedded are present along the circumference of the rotor in the IPM motor with the internally embedded magnets shown in FIG. 15. Accordingly, while a uniform magnetic flux distribution is achieved in the SPM motor having a rotor, the surface of which is covered with magnets, a greater degree of change in the magnetic flux manifests in the IPM motor to result in a greater spatial harmonic component.

Greater spatial harmonics in the motor leads to a greater higher harmonic component in a current flowing to the motor, and thus, problems arise in that the extent to which the motor efficiency is improved is compromised and in that the extent of torque ripple becomes significant. In addition, since the higher harmonic component is superimposed on the fundamental wave component in the current, another problem manifests in that the current peak value increases.

Addressing these problems, the applicant of the present invention proposed a motor control apparatus that reduces the higher harmonics current flowing to an AC motor in Japanese Patent Application No. 2000-356117. This motor control apparatus includes a fundamental wave current control system that controls a motor current in a dq-axis coordinate system which rotates in synchronization with the motor rotation rate and a higher harmonic current control system that controls the motor current in an orthogonal coordinate system rotating at a rotation rate which is an integral multiple of the rotation rate of the dq-axis coordinate system, and generates a voltage command value for a voltage to be applied to the motor based upon the outputs from the two current control systems. The motor control apparatus greatly reduces the higher harmonic current component.

SUMMARY OF THE INVENTION

However, while the motor control apparatus (Japanese Patent Application No. 2000-356117) which includes the two current control systems, i.e., the fundamental wave current control system primarily for controlling the fundamental wave current component and the higher harmonic current control system primarily for controlling the higher harmonic current component achieves control performance in controlling the higher harmonic current component that is greatly improved over the control performance of motor control apparatuses in the related art under normal circumstances, a problem arises when the voltage becomes saturated in that the resulting current distortion is more pronounced than in the motor control apparatuses in the related art.

Normally, a PWM invertor is utilized to implement drive control on an AC motor. A PWM invertor converts a DC voltage supplied from a DC source to an AC voltage equivalent to a voltage command value through the PWM and applies the AC voltage to the motor. Thus, the level of the DC voltage from the DC source determines the maximum value of the AC voltage that can be output.

In the operating range of a motor capable of a large output, the level of the voltage to be applied to the motor is close to the maximum voltage that can be output by the invertor. In addition, it is necessary to apply a large transient voltage to the motor in order to rapidly increase the output, as well. While a voltage, the level of which is higher than that of the maximum voltage that the invertor is capable of outputting may be required under these circumstances, a voltage higher than the maximum that can be output by the invertor cannot be applied to the motor. Hereafter, the state in which a voltage higher than the voltage that the invertor is capable of outputting needs to be applied to the motor is referred to as a "voltage-saturated" state. A voltage saturation tends to occur readily in the motor control apparatus described above in which the higher harmonic component in the voltage increases as a result of the reduction in the higher harmonic current component.

The required current can no longer be supplied to the motor under these circumstances due to an insufficient voltage output. However, the output voltage command value is continuously changed along the direction in which the necessary current is supplied through the two current control systems, i.e., the fundamental wave current control system and the higher harmonic current control system. As a result, a serious current distortion occurs, for instance, after the operation recovers from the voltage-saturated state.

An object of the present invention is to reduce the extent of a current distortion resulting from saturation of an output voltage in a motor control apparatus having a fundamental wave current control system and a higher harmonic current control system.

The motor control apparatus according to the present invention comprises a fundamental wave current control system that controls a fundamental harmonic wave component of a motor current in an orthogonal coordinate system which hypothetically rotates in synchronization with a rotation of a 3-phase AC motor, a higher harmonic current control system that controls a higher harmonic component contained in the motor current in an orthogonal coordinate system hypothetically rotating at a frequency which is an integral multiple of the frequency of the fundamental wave component of the motor current, a voltage command value generating device that generates a 3-phase AC voltage command value by adding the output from the fundamental wave current control system and the output from the higher harmonic current control system, a power conversion device that converts a DC source voltage to a 3-phase AC voltage corresponding to the 3-phase AC voltage command value and outputs the 3-phase AC voltage to the 3-phase AC motor, a voltage saturation detection device which detects that an output voltage from the power conversion device is in a saturated state and a gain adjustment device that reduces a current control gain for the higher harmonic current control system if the voltage saturation detection device detects that the output voltage is in a saturated state.

In the motor control method adopted in the control system which includes a fundamental wave current control system that controls a fundamental wave component of the motor current in an orthogonal coordinate system hypothetically rotating in synchronization with the rotation of a 3-phase AC motor and a higher harmonic current control system that controls a higher harmonic component contained in the motor current in an orthogonal coordinate system hypothetically rotating at a frequency which is an integral multiple of the frequency of the fundamental wave component of the motor current and achieved by adding the output from the fundamental wave current control system and the output from the higher harmonic current control system to generate a 3-phase AC voltage command value, converting a DC source to a 3-phase AC voltage corresponding to the 3-phase AC voltage command value and outputting the 3-phase AC voltage to the 3-phase AC motor, a detection is performed to ascertain whether or not the output voltage output to the 3-phase AC motor by converting the DC source voltage to the 3-phase AC voltage is in a saturated state and the current control gain for the higher harmonic current control system is reduced if the output voltage is in a saturated state.

DETAILED DIRECTION OF THE PREFERRED EMBODIMENTS

First Embodiment

Figure 1:
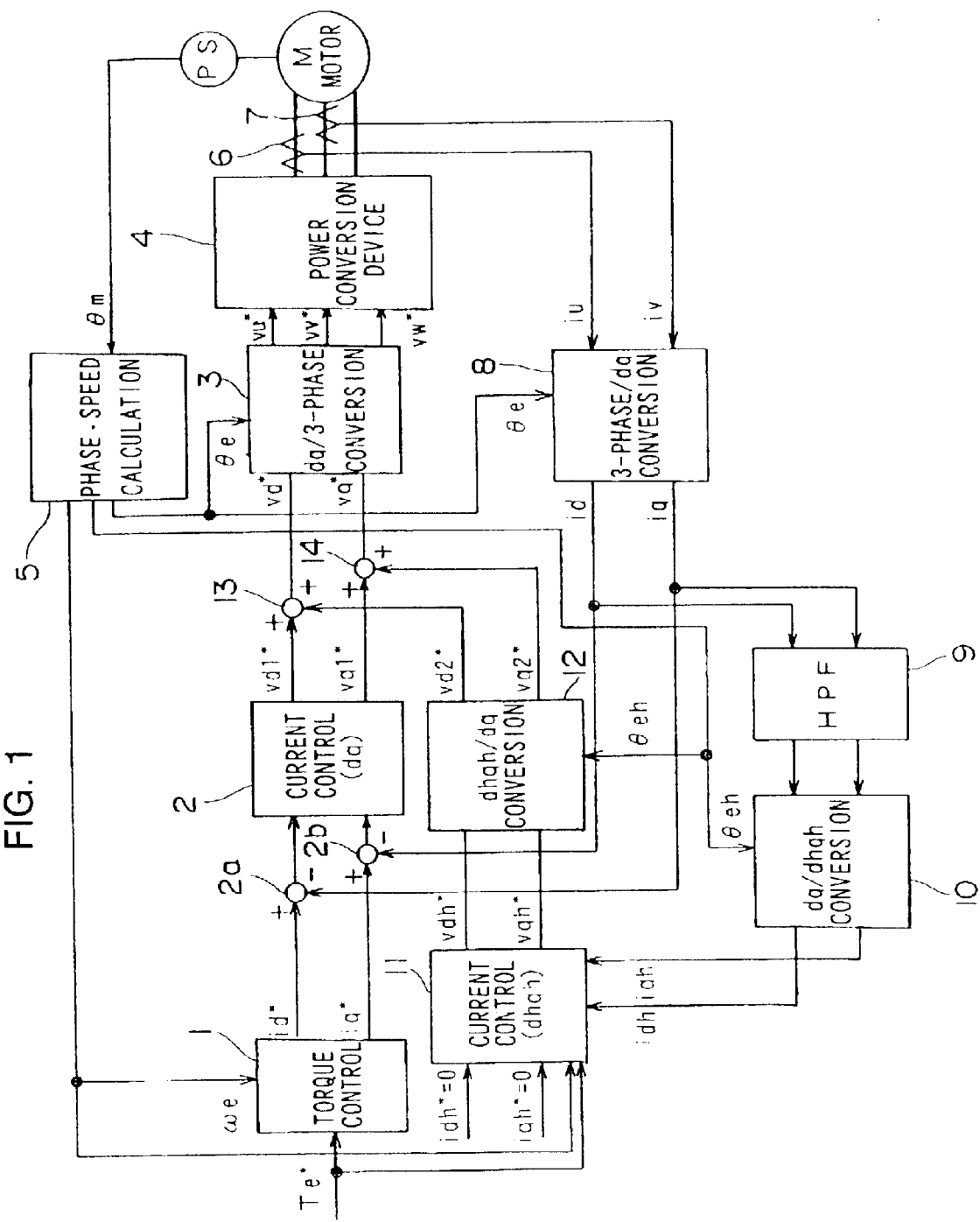
FIG. 1 shows the structure of the motor control apparatus achieved in the first embodiment of the present invention.

FIG. 1 shows the structure of the motor control apparatus achieved in the first embodiment. The motor control apparatus in the first embodiment, which includes a fundamental wave current control system and a higher harmonic current control system, reduces the higher harmonic current and also reduces the current distortion that occurs when the phase voltage becomes saturated. This motor control apparatus implements drive control on the 3-phase current motor through vector control.

The fundamental wave current control system is a circuit that controls primarily the fundamental wave components of 3-phase currents iu, iv and iw flowing through a 3-phase AC motor M by converting the 3-phase currents iu, iv and iw to a d-axis current component and a q-axis current component in an orthogonal coordinate system (hereafter referred to as a dq-axis coordinate system). The dq-axis coordinate system rotates in synchronization with the motor rotation and controlling the d-axis current and the q-axis current resulting from the conversion.

The higher harmonic current control system is a circuit that controls the higher harmonic components contained in the motor currents iu, iv and iw in an orthogonal coordinate system (hereafter referred to as either a higher harmonic coordinate system or a dhqh-axis coordinate system) The dhqh-axis coordinate system rotates with a frequency of a higher harmonic component of a predetermined order which is generated when the motor currents iu, iv and iw are controlled through the fundamental wave current control system alone, i.e., in a higher harmonic coordinate system rotating with a frequency which is an integral multiple of the frequency of the fundamental wave component of the motor currents iu, iv and iw.

The fundamental wave current control system includes a torque control circuit 1, a fundamental wave current control circuit (dq-axis current control circuit) 2, a dq/3-phase conversion circuit 3, a power conversion device 4, a phase speed calculating circuit 5 and a 3-phase/dq conversion circuit 8. The structure assumed in the fundamental wave current control system is similar to that of the motor control apparatus in the related art shown in FIG. 14.

The torque control circuit 1 calculates a command value id* for the d-axis current and a command value iq* for the q-axis current by using a current command value table based upon a torque command value Te* and a motor rotation rate ωe. The fundamental wave current control circuit (dq-axis current control circuit) 2 calculates a d-axis fundamental wave voltage command value vd1* and a q-axis fundamental wave voltage command value vq1* to be used to match actual currents id and iq along the d-axis and the q-axis with the current command values id* and iq* respectively. Namely, it utilizes subtractors 2a and 2b to determine the current deviations by subtracting the actual currents id and iq from the d-axis current command value id* and the q-axis current command value iq* respectively and calculates the d-axis fundamental wave voltage command value vd1* and the q-axis fundamental wave voltage command value vq1* to be used to reduce the current deviations to 0 by engaging an operational amplifier internally provided in the current control circuit 2.

The dq/3-phase conversion circuit 3 converts a d-axis voltage command value vd* and a q-axis voltage command value vq* to 3-phase AC voltage command values vu*, vv* and vw* based upon a phase θe of fundamental wave current at the 3-phase AC motor M. The current conversion device (invertor) 4 switches a DC voltage from a DC source (not shown) such as a battery based upon the 3-phase AC voltage command values vu*, vv* and vw* with a switching element which may be an IGBT and generates 3-phase AC voltages VU, VV and VW which are then applied to the 3-phase AC motor M.

An encoder PS, which is connected to the 3-phase AC motor M detects a rotational position θm of the motor M. The detected rotational position θm is provided to the phase·speed calculating circuit 5. The phase speed·calculating circuit 5 calculates a rotation rate ωe of the motor M, the phase of the fundamental wave component of the magnetic flux, i.e., the phase θe along the d-axis and the phase of the higher harmonic component of the magnetic flux, i.e., the phase θeh along the dh-axis based upon rotational position signal θm provided by the encoder PS.

Current sensors 6 and 7 respectively detect the actual currents iu and iv at the U-phase and the V-phase in the 3-phase AC motor M. The detected U-phase current iu and V-phase current iv are provided to the 3-phase/dq conversion unit 8. The 3-phase/dq conversion unit 8 converts the actual currents iu, iv and iw (=−iu−iv) at the 3-phase AC motor M to the actual current id along the d-axis and the actual current iq along the q-axis based upon the fundamental wave current phase θe.

The higher harmonic current control system includes the 3-phase/dq conversion circuit 8, a high-pass filter 9, a dq/dhqh conversion circuit 10, a higher harmonic current control circuit (dhqh-axis current control circuit) 11 and a dhqh/dq conversion circuit 12. The high-pass filter 9 extracts the higher harmonic components by filtering the actual current id along the d-axis and the actual current iq along the q-axis. The dq/dhqh conversion circuit 10, which has the orthogonal coordinate system (higher harmonic coordinate system) dhqh mentioned earlier, converts the higher harmonic components of the actual current id along the d-axis and the actual current iq along the q-axis to actual currents idh and iqh in the higher harmonic coordinate system dhqh.

The higher harmonic current control circuit (dhqh-axis current control circuit) 11 calculates a dh-axis higher harmonic voltage command value vdh* and a qh-axis higher harmonic voltage command value vqh* to be used to match the actual currents idh and iqh along the dh-axis and the qh-axis with the current command values idh* and iqh* respectively. The higher harmonic current command values idh* and iqh* in this instance are both 0. In other words, the higher harmonic current control circuit 11 controls the higher harmonic currents so as to set the higher harmonic components of the predetermined order mentioned earlier among the higher harmonic components contained in the motor currents iu, iv and iw to 0.

The dhqh/dq conversion circuit 12 converts the dh-axis higher harmonic voltage command value vdh* and the qh-axis higher harmonic voltage command value vqh* to a d-axis higher harmonic voltage command value vd2* and a q-axis higher harmonic voltage command value vq2* respectively. The higher harmonic voltage command values vd2* and vq2* resulting from the conversion are then provided to adders 13 and 14. The adders 13 and 14 add the fundamental wave voltage command values vd1* and vq1* generated in the fundamental wave current control system to the higher voltage command values vd2* and vq2* generated in the higher harmonic current control system respectively to calculate ultimate d-axis voltage command value vd* (=vd1*+vd2*) and q-axis voltage command value vq* (=vq1*+vq2*).

Figure 14:
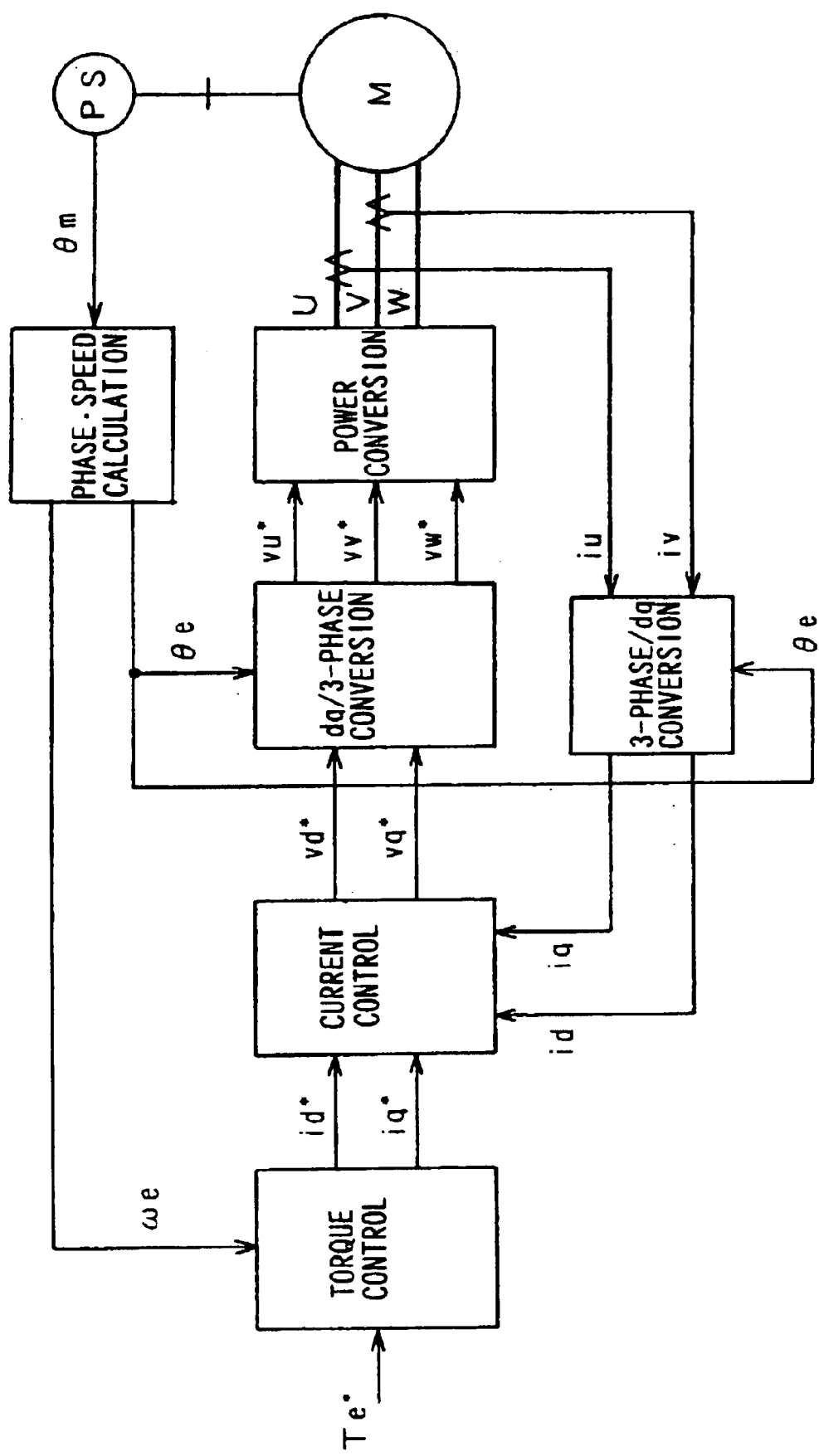
FIG. 14 shows the structure of a motor control apparatus in the related art.
Figure 15:
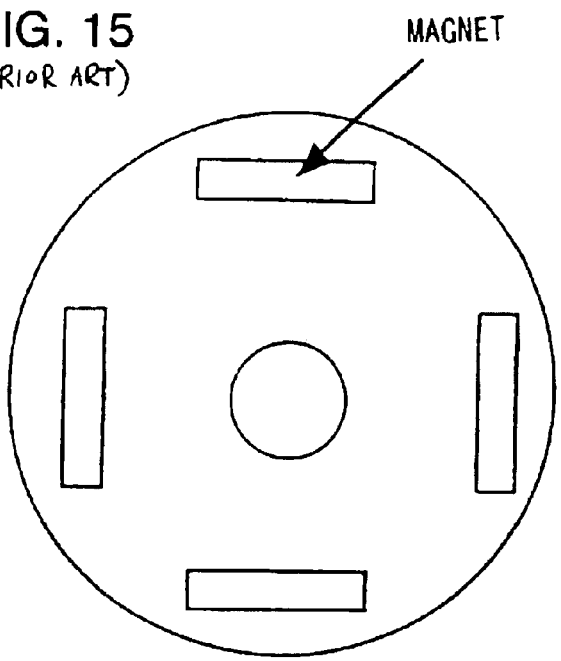
FIG. 15 presents a sectional view of an IPM motor adopting the internally embedded magnet structure.
Figure 16:
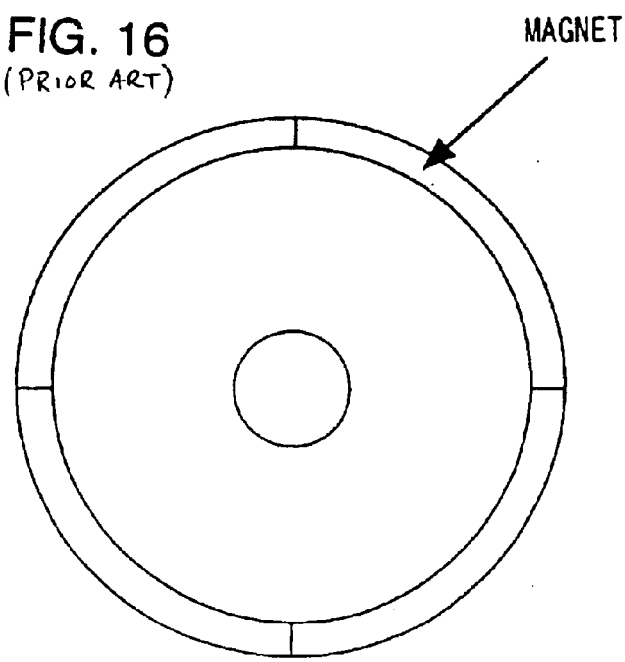
FIG. 16 presents a sectional view of an SPM motor adopting the surface magnet structure.

What differentiates the current control system of the motor control apparatus in the first embodiment shown in FIG. 1 from the current control system in the motor control apparatus in the related art shown in FIG. 14, i.e., from the current control system that controls the motor currents in the dq-axis coordinate system rotating in synchronization with the motor rotation, is the high-pass filter 9, the dq/dhqh conversion circuit 10, the higher harmonic current control circuit 11, the dhqh/dq conversion circuit 12 and the adders 13 and 14. It is difficult to ensure reliable conformance of the actual currents to the current command values up to the frequency range of the higher harmonic currents attributable to the spatial harmonics of the motor through the current control calculation executed in a motor control apparatus having only the dq-axis coordinate system. In such a motor control apparatus, problems arise in that only a slight improvement can be achieved with regard to the efficiency of the concentrated winding IPM motor, in that a significant torque ripple manifests and in that the peak value of the current increases, as explained earlier. These problems are now explained in further detail.

In the dq-axis coordinate system, which rotates in synchronization with the motor rotation, the level of a fundamental wave current at the motor is translated as a direct current quantity. When ωeh represents the angular frequency of a higher harmonic current and we represents the angular speed of the motor, i.e., the angular frequency of the fundamental wave current, the angular frequency ωeh_dq of the higher harmonic current in the dq-axis coordinate system is expressed as (ωeh−ωe), and thus, the higher harmonic component of the motor current cannot be represented by a direct current quantity in the dq-axis coordinate system. For this reason, since the frequency of the higher harmonic component, too, increases as the motor rotation rate becomes higher when the frequency of a motor current increases in response to an increase in the motor rotation rate, the actual current can no longer be made to conform to the current command value through the method which utilizes the dq-axis coordinate system alone.

In the motor control apparatus in the first embodiment, the current conformity of the higher harmonic component of the predetermined order is improved and the higher harmonic component of the predetermined order is reduced by utilizing the higher harmonic current control system (8~12) shown in FIG. 1 and the adders 13 and 14. It is assumed that akth-order higher harmonic component is reduced in the first embodiment so as to facilitate the explanation.

The d-axis actual current id and the q-axis actual current iq output from the 3-phase/dq conversion unit 8 each contain a fundamental wave component which is represented by a direct current quantity and a higher harmonic component which is represented by an AC quantity. The high-pass filter 9 extracts only the high frequency component in the actual currents id and iq. The actual currents idh and iqh in the dhqh-axis coordinate system rotating at a phase ($\theta$eh–$\theta$e) that are obtained by converting the kth-order higher harmonic components contained in the actual currents id and iq which have been extracted by the high-pass filter 9 to actual currents in the dhqh-axis coordinate system by utilizing the dq/dhqh conversion circuit 10 are represented by direct current quantities. $\theta$eh represents the phase of a kth-order higher harmonic current. Thus, by executing the current control calculation in the dhqh-axis coordinate system, the conformity of a kth-order higher harmonic current to the corresponding current command value (=0) is greatly improved. As a result, the higher harmonic currents contained in the motor currents iu, iv and iw can be reduced. In particular, the higher harmonic currents of the kth-order and in the vicinity of the kth-order can be greatly reduced.

Figure 2:
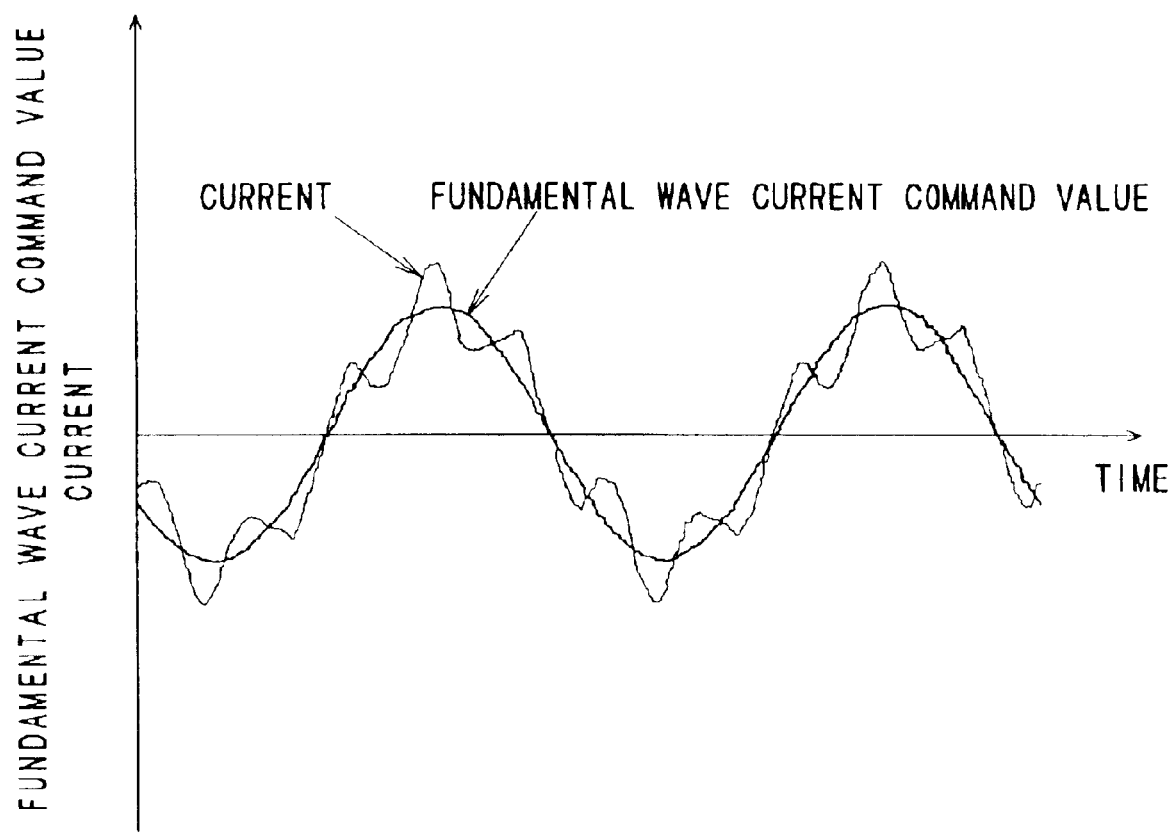
FIG. 2 shows the results of the current control implemented by a motor control apparatus in the related art.
Figure 3:
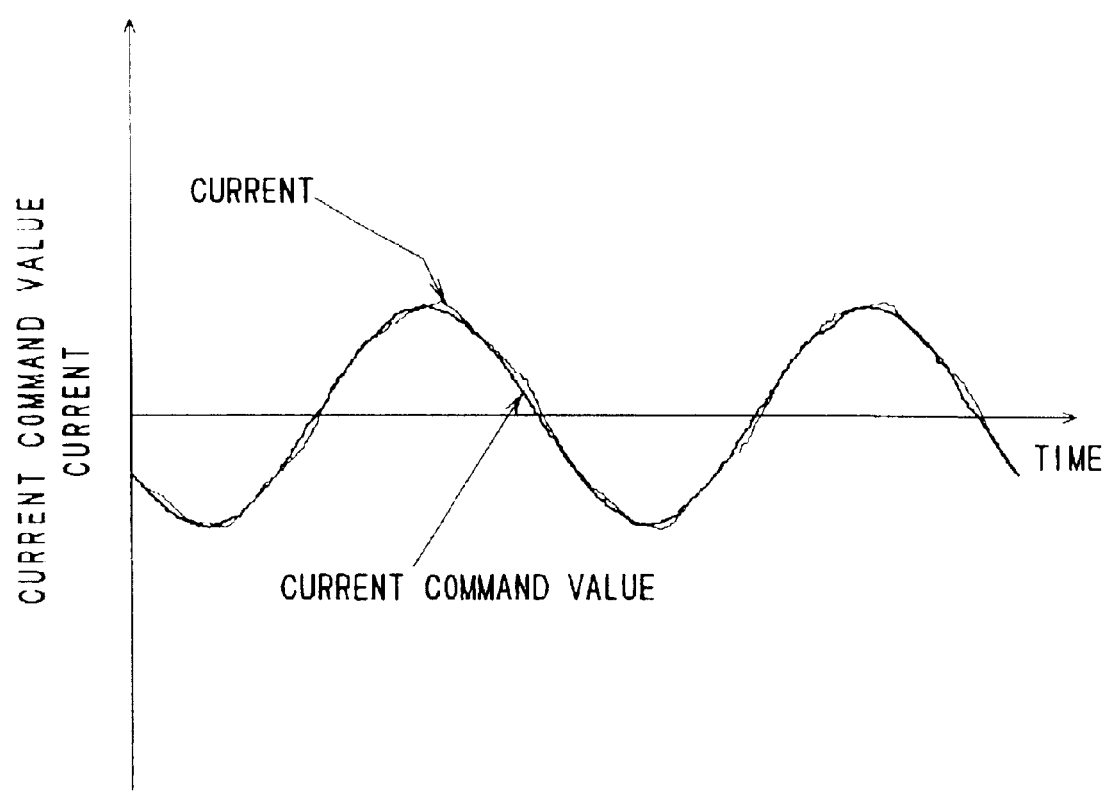
FIG. 3 shows the results of the current control implemented by the motor control apparatus in the first embodiment.

FIG. 2 shows the waveform of a U-phase current corresponding to a U-phase current command value, achieved by driving a concentrated winding IPM motor in which a significant spatial harmonic component manifests with a motor control apparatus in the related art. FIG. 3, on the other hand, shows the waveform of a U-phase current corresponding to a U-phase current command value, achieved by driving the concentrated winding IPM motor with the motor control apparatus in the first embodiment. When the motor is driven with the motor control apparatus in the related art, a great deal of the higher harmonic component is contained in the motor current, as FIG. 2 clearly indicates. In contrast, the higher harmonic component is greatly reduced as shown in FIG. 3 when the motor is driven by the motor control apparatus in the first embodiment. In other words, the higher frequency component at and near a predetermined order contained in the motor current can be reduced.

A specific voltage must be applied to the motor in order to reduce the extent of the current distortion. However, there is a limit to the level of the voltage that can be output by the invertor, and when the motor is driven at a high rotation rate and with a high output or when the output is increased dramatically within a short period of time, the voltage required to achieve conformity to the current command value cannot always be output. In other words, the voltage which is equivalent to the output voltage command value calculated based upon the sum of the output from the fundamental wave current control system and the output from the higher harmonic current control system can no longer be output. In a motor control apparatus having two types of current control systems such as the motor control apparatus in the embodiment, the extent of the current distortion is larger than that in a motor control apparatus provided with the fundamental wave current control system alone. This problem is addressed by providing the higher harmonic current control circuit 11 which operates in the dhqh-axis coordinate system.

Figure 4:
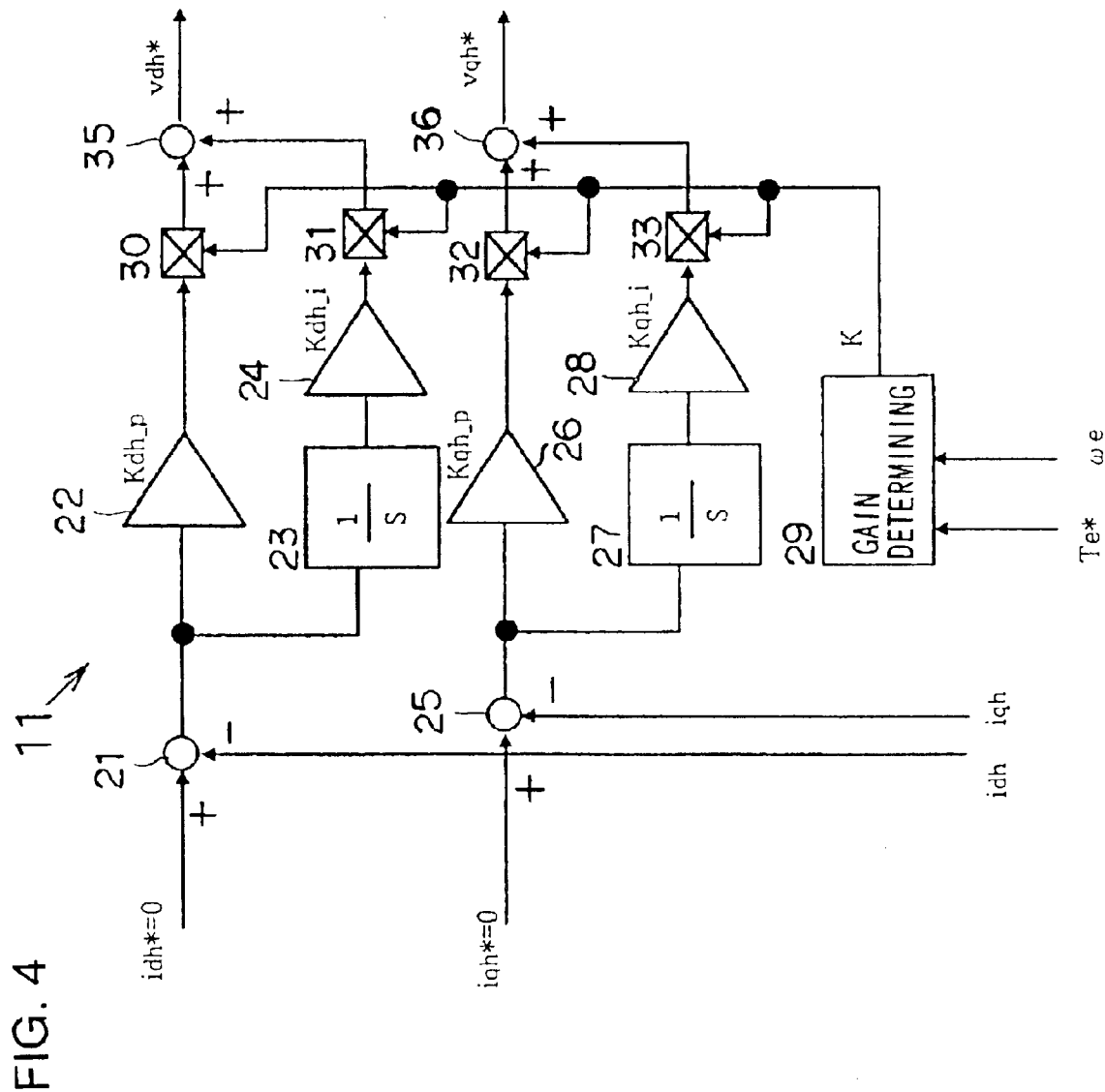
FIG. 4 shows in detail the structure assumed in the higher harmonic current control circuit in the first embodiment.

FIG. 4 shows in detail the structure of the higher harmonic current control circuit (dhqh-axis current control circuit) 11. The higher harmonic current control circuit 11 implements proportional integral (PI) operation control both on the dh-axis current component and the qh-axis current component. A subtractor 21 subtracts the dh-axis actual current idh from the dh-axis current command value idh* (=0) and thus determines the current deviation (idh*–idh). A proportional operational amplifier 22 amplifies the current deviation (idh*–idh) obtained at the subtractor 21. An integrator 23 integrates the current deviation (idh*–idh) obtained at the subtractor 21 and outputs the results of the integration to an integration operational amplifier 24. The integration operational amplifier 24 amplifies the integrated value obtained by integrating the current deviation (idh*–idh).

Likewise, a subtractor 25 subtracts the qh-axis actual current iqh from the qh-axis current command value iqh* (=0) and thus determines the current deviation (iqh*–iqh). A proportional operational amplifier 26 amplifies the current deviation (iqh*–iqh) obtained at the subtractor 25. An integrator 27 integrates the current deviation (iqh*–iqh) obtained at the subtractor 25 and outputs the results of the integration to an integration operational amplifier 28. The integration operational amplifier 28 amplifies the integrated value obtained by integrating the current deviation (iqh*–iqh).

Figure 5:
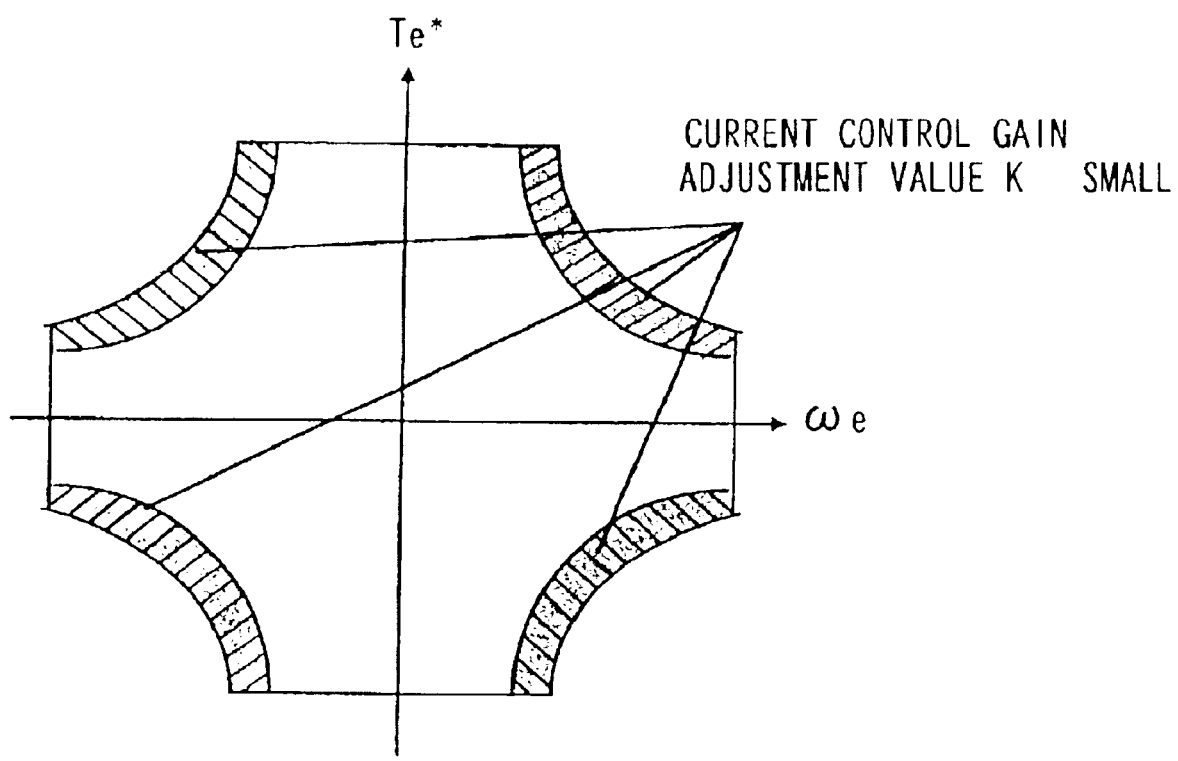
FIG. 5 illustrates how the current control gain adjustment value K is determined.

A gain determining circuit 29 determines a value K to be used to adjust a current control gain based upon the torque command value Te* and the motor rotation rate $\omega$e. The current control gain adjustment value K is set in advance so that the gain adjustment value K becomes lower in a range close to the maximum output over which a large source voltage is required, i.e., in the hatched range in FIG. 5 over which the motor output ($\propto \omega$e+Te*) is large, in order to reduce the extent of the current distortion occurring in the event of a voltage saturation. As a result, the current control gain used to calculate the dh-axis voltage command value vdh* and the qh-axis voltage command value vqh* is set at a small value in the high output range to minimize the current distortion.

The current control gain adjustment value K determined at the gain determining circuit 29 is provided to multipliers 30~33 which, in turn, set current control gains corresponding to the adjustment value K. The output from the dh-axis proportional operational amplifier 22, the output from the integration operational amplifier 24, the output from the qh-axis proportional operational amplifier 26 and the output from the integration operational amplifier 28 are multiplied by the respective current control gains. An adder 35 adds a value obtained by multiplying the output from the proportional operational amplifier 22 by the corresponding current control gain to a value obtained by multiplying the output from the integration operational amplifier 24 by the corresponding current control gain, and thus generates the dh-axis voltage command value vdh*. An adder 36 adds a value obtained by multiplying the output from the proportional operational amplifier 26 by the corresponding current control gain to a value obtained by multiplying the output from the integration operational amplifier 28 by the corresponding current control gain, and thus generates the qh-axis voltage command value vqh*.

In the range close to the motor maximum output over which a large source voltage is required, the output voltage tends to become saturated readily, which will result in a significant current distortion. For this reason, in the motor control apparatus in the first embodiment, the motor output ($\propto \omega$e·Te*) is ascertained based upon the rotation rate we of the motor M and the torque command value Te* and the current control gain for the higher harmonic current control system is reduced in the operating range corresponding to a high motor output range over which the likelihood of an output voltage saturation is high. As a result, the higher harmonic voltage components contained in the output voltages from the power conversion device (invertor) 4 are reduced to ensure that the output voltage does not become saturated readily, thereby reducing the frequency of occurrence of the current distortion. In addition, even if the output voltage does become saturated, the extent of the current distortion is minimized by reducing the control gain for the higher harmonic current control system.

Second Embodiment

In the first embodiment described above, saturation of the output voltage is detected by ascertaining the output state of the motor. In the motor control apparatus achieved in the second embodiment, saturation of the output voltage is detected based upon a phase voltage command value.

Figure 6:
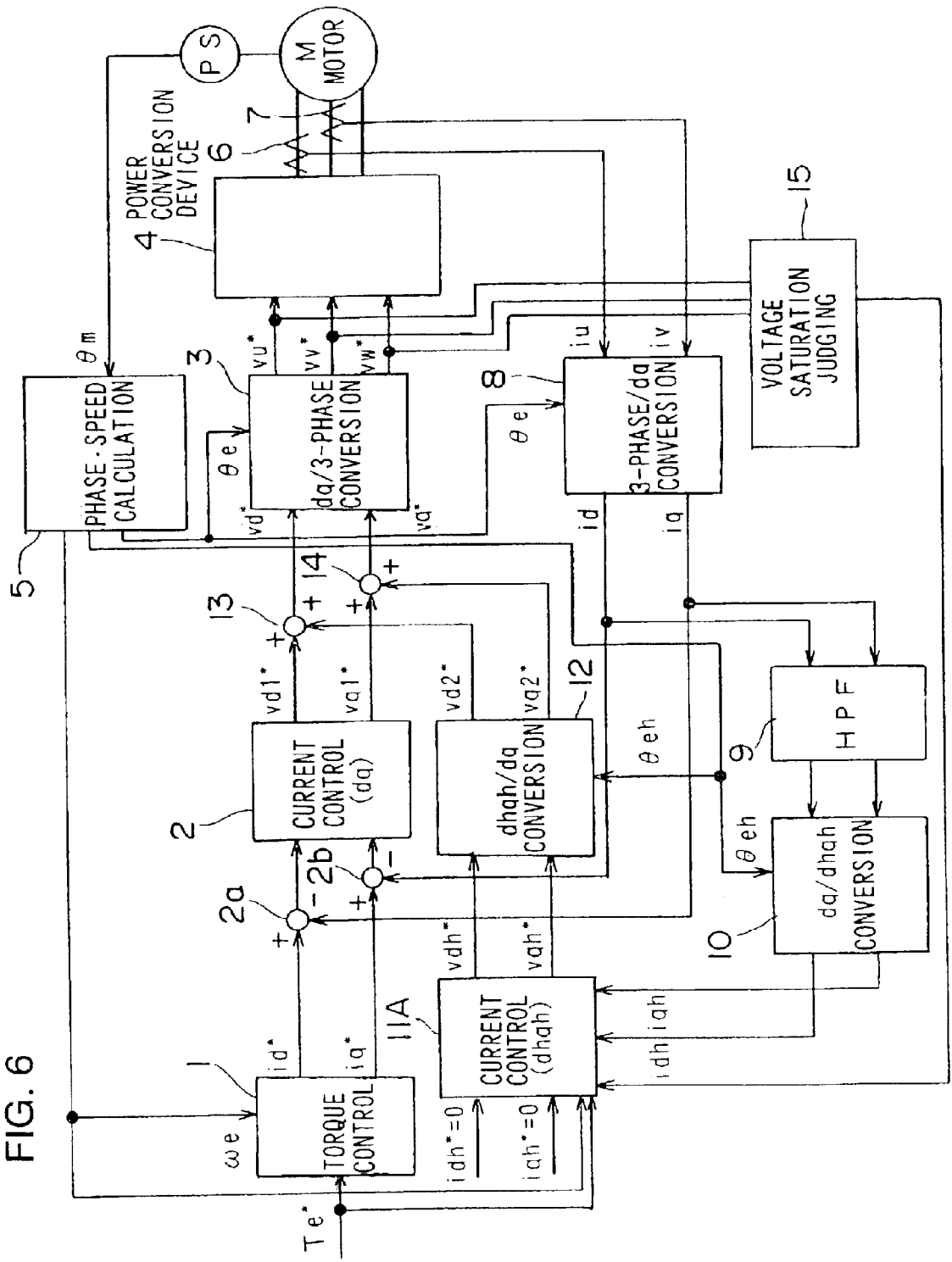
FIG. 6 shows the structure of the motor control apparatus achieved in a second embodiment.

FIG. 6 shows the structure of the motor control apparatus achieved in the second embodiment. It is to be noted that the same reference numerals are assigned to functional blocks having functions similar to those of control blocks shown in FIG. 1 and the following explanation focuses on the differences.

Figure 7:
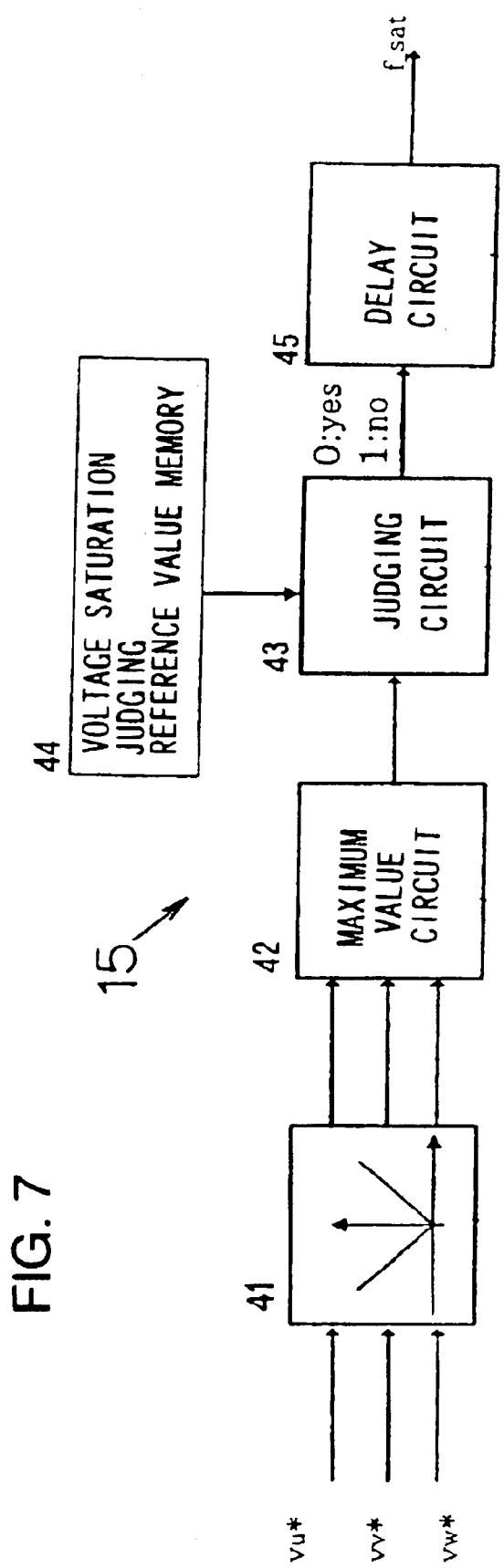
FIG. 7 shows in detail the structure assumed in the voltage saturation judging circuit in the second embodiment.

A voltage saturation judging circuit 15 judges as to whether or not the output voltage is in a saturated state based upon phase voltage command values vu*, vv* and vw* corresponding to the three phases. The structure assumed in the voltage saturation judging circuit 15 is shown in detail in FIG. 7. An absolute value circuit 41 determines the absolute values of the 3-phase voltage command values vu*, vv* and vw*. A maximum value circuit 42 determines the maximum value among the absolute values of the 3-phase voltage command values vu*, vv* and vw* ascertained by the absolute value circuit 41.

A judging circuit 43 judges as to whether not the maximum value among the absolute values of the 3-phase voltage command values vu*, vv* and vw*, which has been determined by the maximum value circuit 42 is larger than a voltage saturation decision-making reference value stored in a memory 44. If the maximum value among the 3-phase voltage command values is larger than the judging reference value, the judging circuit 43 judges that an output voltage is in a saturated state and outputs 0. If, on the other hand, the maximum value among the 3-phase voltage command values is smaller than the decision-making reference value, the judging circuit 43 judges that the output voltages are not in a saturated state and outputs 1 accordingly. A delay circuit 45 outputs a voltage saturation signal f_sat with a predetermined delay following the point in time at which the output from the judging circuit 43 rises from 0 to 1, i.e., following the time point at which the output voltage-saturated state is cleared.

Figure 8:
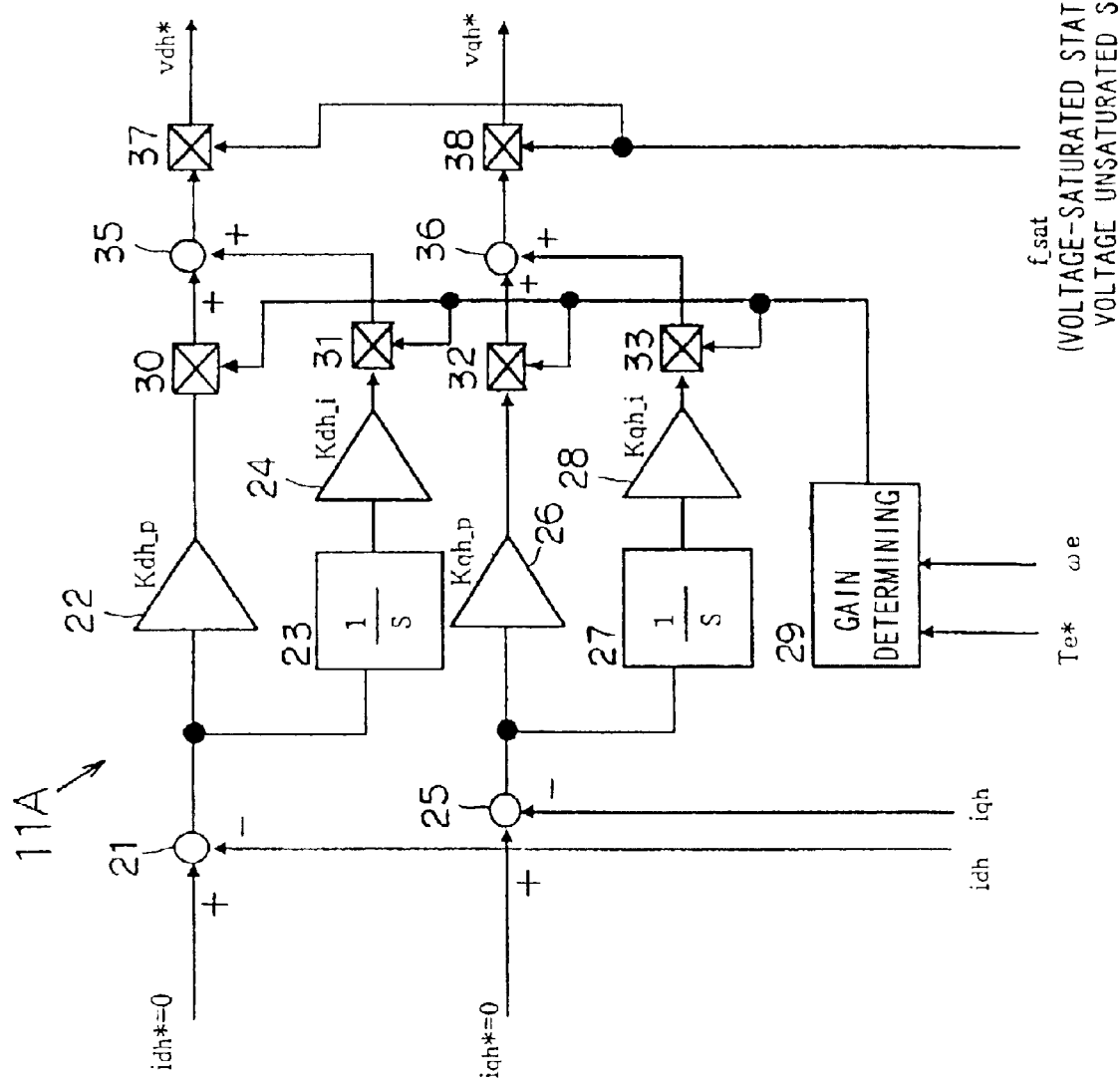
FIG. 8 shows in detail the structure assumed in the higher harmonic current control circuit in the second embodiment.

If it is decided by the voltage saturation judging circuit 15 that an output voltage is in a saturated state, the voltage saturation signal f_sat is set to 0, whereas if it is decided that the output voltages are not in a saturated state, the voltage saturation signal f_sat is set to 1. The voltage saturation signal f_sat is input to a higher harmonic current control circuit (dhqh-axis current control circuit) 11A. FIG. 8 shows in detail the structure assumed by the higher harmonic current control circuit 11A.

The same reference numerals are assigned to devices in FIG. 8 that are similar to those in the higher harmonic current control circuit 11 in the first embodiment shown in FIG. 4, and the following explanation focuses on the differences. A multiplier 37 multiplies the sum of the output from the proportional operational amplifier 22 and the output from the integration operational amplifier 24 each having been multiplied by the corresponding dh-axis current control gain by the value of the voltage saturation signal f_sat and thus generates a dh-axis voltage command value vdh*. A multiplier 38 multiplies the sum of the output from the proportional operational amplifier 26 and the output from the integration operational amplifier 28 each having been multiplied by the corresponding qh-axis current control gain by the value of the voltage saturation signal f_sat and thus generates a qh-axis voltage command value vqh*. In other words, if the output voltage is detected to be in a saturated state, the dh-axis voltage command value vdh* and the qh-axis voltage command value vqh* are both calculated to be 0. This is equivalent to setting the current control gain for the higher harmonic current control system to 0 when a voltage saturation has occurred.

In the motor control apparatus in the second embodiment, a decision is made as to whether or not the output voltage is in a saturated state based upon the 3-phase voltage command values vu*, vv* and vw* and the dh-axis voltage command value vdh* and the qh-axis voltage command value vqh* generated in the higher harmonic current control system are set to 0 if an output voltage saturated state is detected, i.e., the current control gain for the higher harmonic current control system is set to 0 if an output voltage saturated state is detected. As a result, the higher harmonic voltage components contained in the output voltages from the power conversion device (invertor) 4 are reduced to prevent an output voltage saturation from occurring readily, which, in turn, reduces the frequency with which the current distortion occurs. In addition, since the control gain at the higher harmonic current control system is set to 0, the extent of current distortion can be reduced even when output voltage saturation has occurred.

Furthermore, since it is judged as to whether or not the output voltages are in a saturated state based upon the 3-phase voltage command values vu*, vv* and vw*, the saturated state can be detected with a high degree of reliability regardless of which of the output voltages, i.e., which of the 3-phase voltages, is in a saturated state. Moreover, as the current control gain is continuously reduced over a predetermined length of time even when an output voltage saturated state is no longer detected, the current control gain is not switched frequently over a short period of time, to minimize the motor torque fluctuation.

Third Embodiment

In the second embodiment described above, a detection is performed to ascertain whether or not the output voltage is in a saturated state based upon the 3-phase voltage command values vu*, vv* and vw*. In the motor control apparatus in the third embodiment, on the other hand, an output voltage-saturated state is detected based upon d-axis voltage command value vd1* and the q-axis voltage command value vq1*, the dh-axis voltage command value vd2* and the qh-axis voltage command value vq2*.

Figure 9:
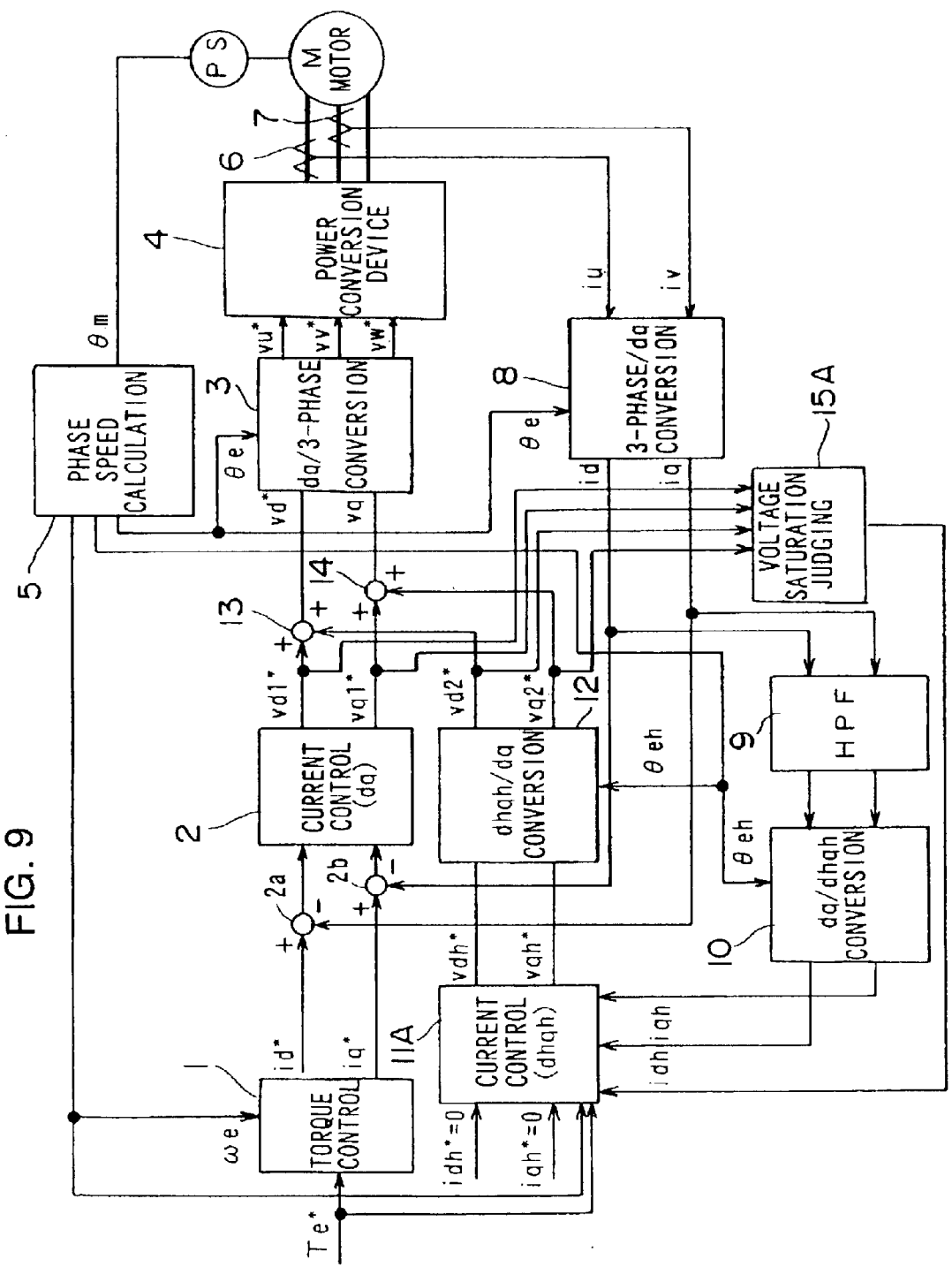
FIG. 9 shows the structure of the motor control apparatus achieved in a third embodiment.

FIG. 9 shows the structure adopted in the motor control apparatus in the third embodiment. It is to be noted that the same reference numerals are assigned to control blocks having functions similar to those in the control block diagrams presented in FIGS. 1 and 6, and the following explanation focuses on the differences.

Figure 10:
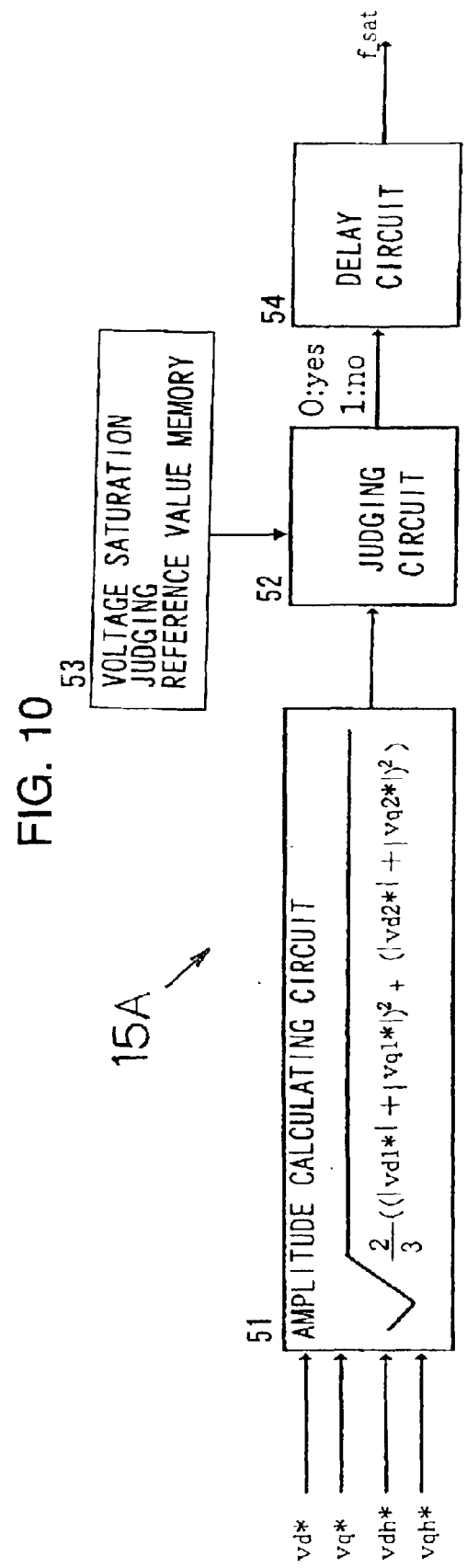
FIG. 10 shows in detail the structure assumed in the voltage saturation judging circuit in the third embodiment.

A voltage saturation judging circuit 15A judges as to whether or not the output voltages are in a saturated state based upon the d-axis and the q-axis voltage command values vd1* and vq1* and the dh-axis and the qh-axis voltage command values vd2* and vq2*. FIG. 10 shows in detail the structure adopted in the voltage saturation judging circuit 15A in the third embodiment. An amplitude calculating circuit 51 calculates the amplitude AMP of the 3-phase voltage through the following formula (1).

$$AMP=\sqrt{[2/3\{(|vd1^*|+|vq1^*|)^2+(|vd2^*|+|vq2^*|)^2\}]} \quad (1)$$

This amplitude AMP represents the maximum value among the 3-phase voltages in a single cycle.

Figure 11:
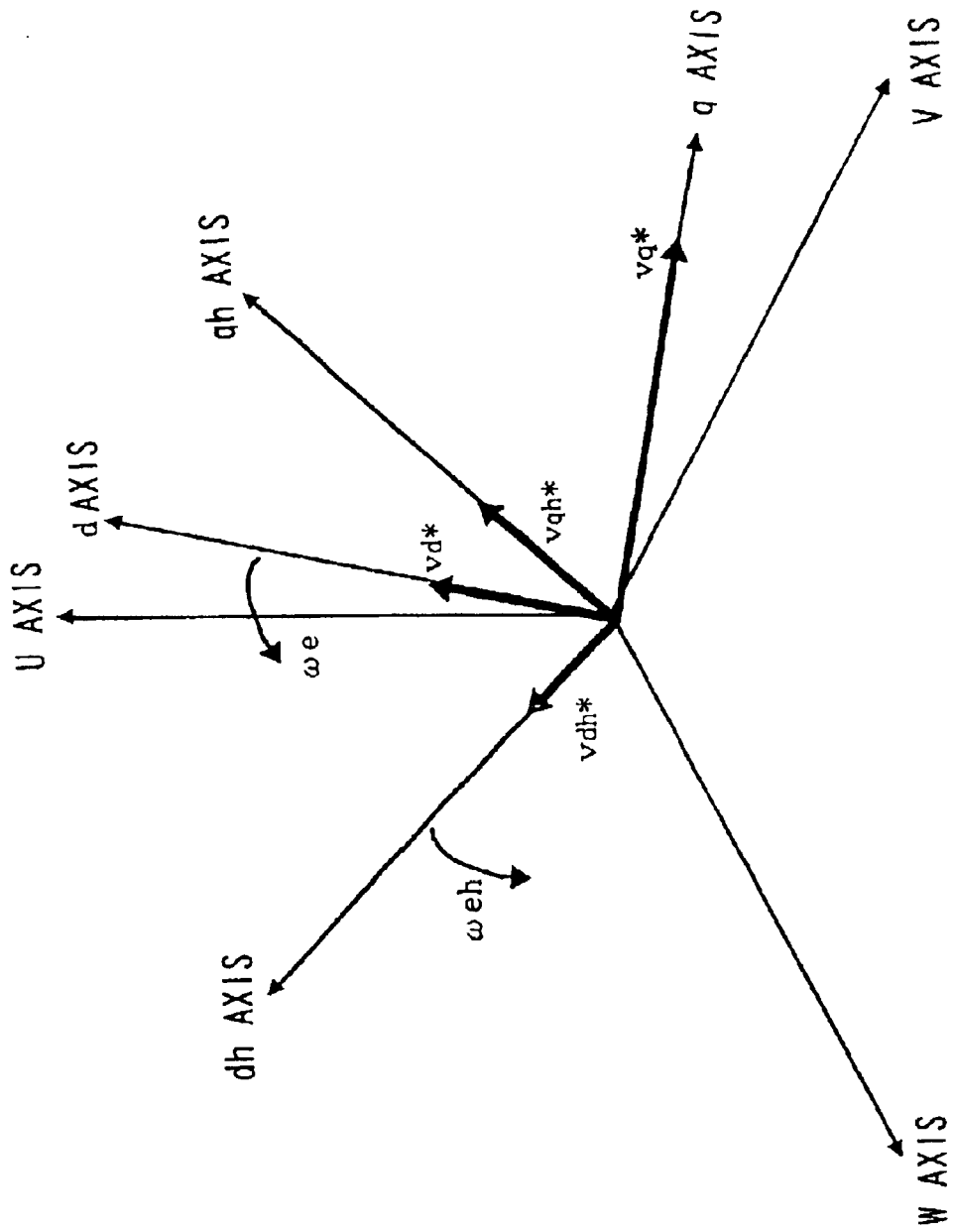
FIG. 11 illustrates the relationship between the dq axes and the dhqh axes.

FIG. 11 shows the relationship between the d-axis and q-axis voltage command values vd* and vq* and the dh-axis and qh-axis voltage command values vdh* and vqh*. The d-axis and the q-axis constitute a coordinate system of the fundamental wave currents, which rotates at the angular speed ωe of the motor M, whereas the dh-axis and the qh-axis constitute a coordinate system of the higher harmonic currents, which rotates at an angular speed ωeh that is an integral multiple of the angular speed at which the fundamental wave current coordinate system rotates. While the phase voltages change constantly since these coordinate systems rotate at different speeds, the maximum value of the phase voltages per cycle can be ascertained with ease through formula (1) above.

A judging circuit 52 illustrated in FIG. 10 judges as to whether or not the maximum value of the phase voltages in a single cycle determined by the amplitude calculating circuit 51 is larger than a voltage saturation judging reference value stored in a memory 53. If the maximum value of the phase voltages per cycle is larger than the judging reference value, the judging circuit 52 judges that an output voltage is in a saturated state and outputs 0. If, on the other hand, the maximum value of the phase voltages per cycle is smaller than the judging reference value, the judging circuit 52 judges that the output voltages are not in a saturated state and outputs 1. A delay circuit 54 outputs a voltage saturation signal f_sat with a predetermined delay following the point in time at which the output from the judging circuit 52 rises from 0 to 1, i.e., at the time point at which the output voltage-saturated state is cleared.

If it is decided by the voltage saturation judging circuit 15A that an output voltage is in a saturated state, the voltage saturation signal f_sat is set to 0, whereas if the output voltages are determined not o be in a saturated state, the voltage saturation signal f_sat is set to 1. This voltage saturation signal f_sat is input to the higher harmonic current control circuit (dhqh-axis current control circuit) 11A (see FIG. 8). The higher harmonic current control circuit 11A changes the current control gain in correspondence to the voltage saturation signal f_sat as explained earlier.

As described above, in the motor control apparatus in the third embodiment, it is judged as to whether or not the output voltages are in a saturated state based upon the d-axis and the q-axis voltage command values vd1* and vq1* and the dh-axis and the qh-axis voltage command values vd2* and vq2*, and the dh-axis and the qh-axis voltage command values vdh* and vqh* generated in the higher harmonic current control system are set to 0, i.e., the current control gains for the higher harmonic current control system are set to 0, if an output voltage-saturated state is detected. As a result, the higher harmonic voltage components contained in the output voltages from the power conversion device (invertor) 4 are reduced to prevent an output voltage saturation from occurring readily, which, in turn, reduces the frequency with which the current distortion occurs. In addition, since the control gains at the higher harmonic current control system are set to 0, the extent of the current distortion can be reduced even when an output voltage saturation has occurred.

Since an output voltage-saturated state is detected based upon the amplitude of the output voltage, which is determined in conformance to the d-axis and the q-axis voltage command values vd1* and vq1* and the dh-axis and the qh-axis voltage command values vd2* and vq2*, a stable detection of an output voltage-saturated state is enabled by preventing frequent switching in the judging results even when an output voltage saturated state and an output voltage unsaturated state alternate repeatedly over a short period of time. Furthermore, as the current control gain is continuously reduced over the predetermined length of time even when an output voltage saturated state is no longer detected, the current control gain is not switched frequently over a short period of time to minimize the motor torque fluctuation.

Fourth Embodiment

Figure 12:
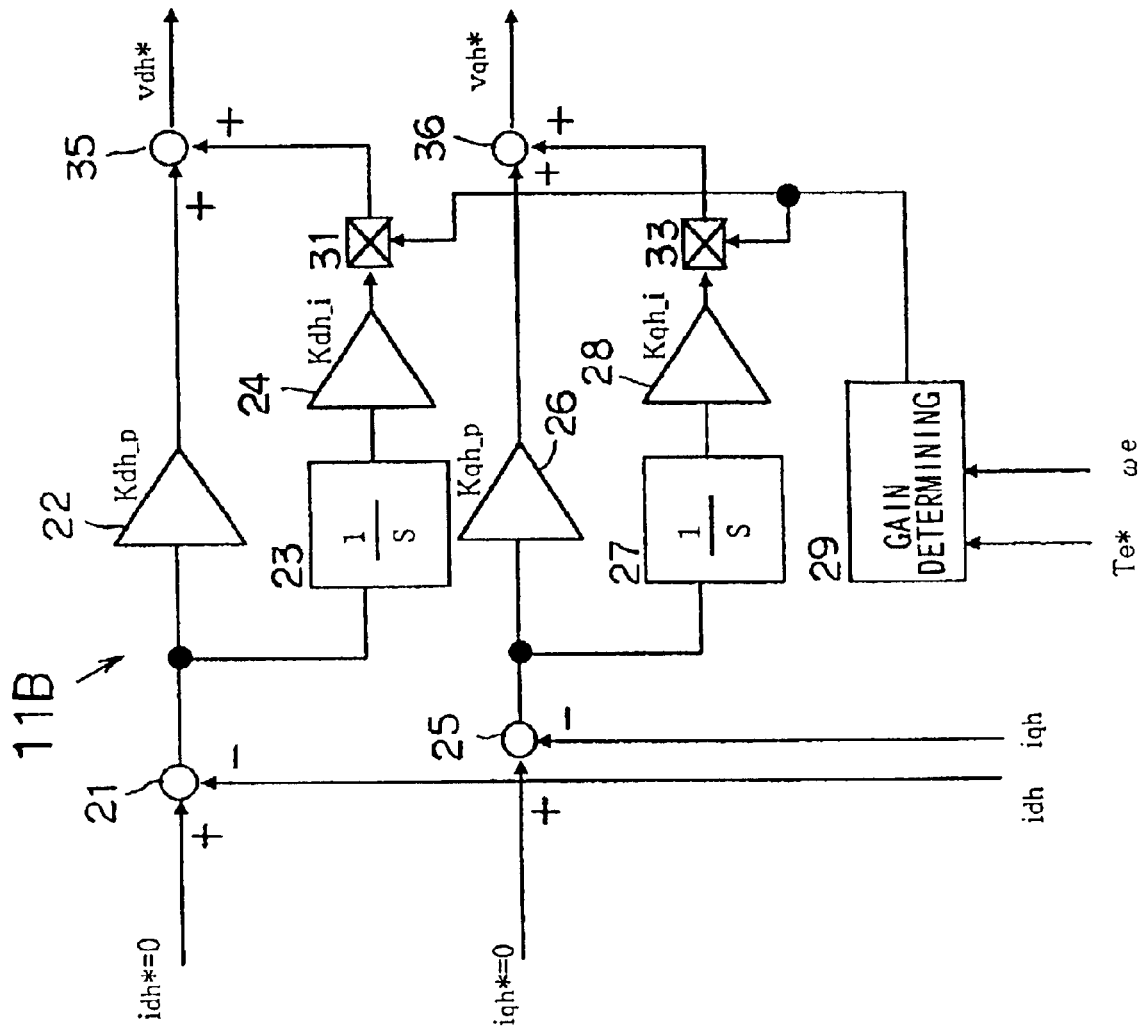
FIG. 12 shows in detail the structure assumed in the higher harmonic current control circuit in a fourth embodiment.
Figure 13:
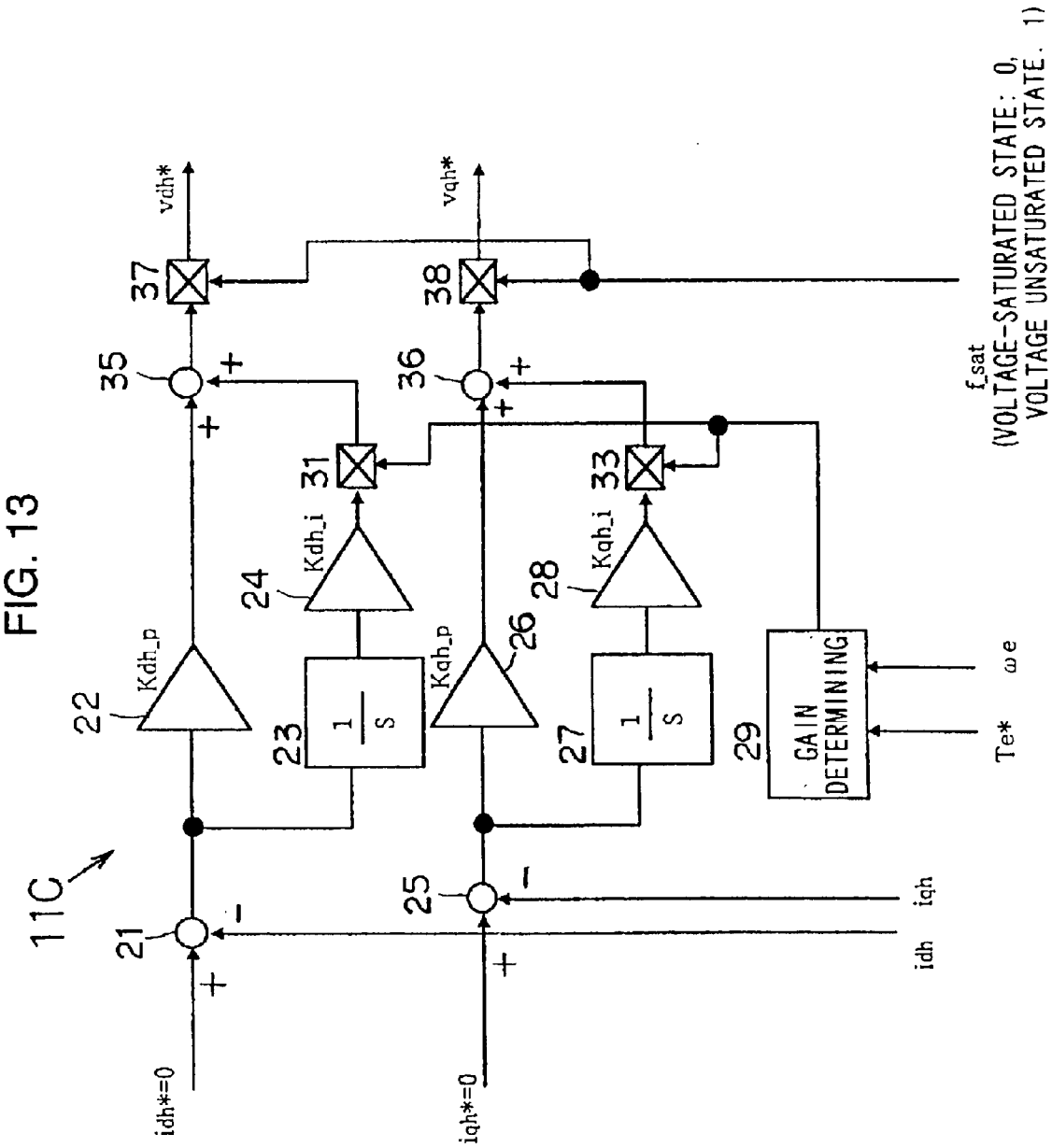
FIG. 13 shows another structure that may be adopted in the higher harmonic current control circuit in the fourth embodiment.

In each of the embodiments explained above, the higher harmonic current control circuit (dhqh-axis current control circuit) 11 (see FIG. 4) or 11A (see FIG. 8) is employed to change both of the current control gains, i.e., the proportional control (P) gain and the integral control (I) gain. Instead, the integral control (I) gain alone may be varied as shown in FIG. 12 (corresponding to FIG. 4) and FIG. 13 (corresponding to FIG. 8) to reduce the integral control (I) gain alone if an output voltage-saturated state is detected. While the accuracy of the control output improves in the steady state by increasing the integral control (I) gain in the control system under normal circumstances, the higher integral control (I) gain increases the response time in a transient state. Accordingly, by reducing the integral control gain or setting the integral control gain to 0 if any of the output voltages becomes saturated, the responsiveness of the higher harmonic current control system is maintained and thus, the extent of the current distortion can be further reduced.

The above described embodiments are examples, and various modifications can be made without departing from the spirit and scope of the invention. For instance, no restrictions are imposed with regard to the type of AC motor, and the motor control apparatus in any of the embodiments may be adopted in conjunction with a synchronous motor or an induction motor.

What is claimed is:

1. A motor control apparatus comprising:
   a fundamental wave current control system that controls a fundamental wave component of a motor current in an orthogonal coordinate system which hypothetically rotates in synchronization with a rotation of a 3-phase AC motor;
   a higher harmonic current control system that controls a higher harmonic component contained in the motor current in an orthogonal coordinate system hypothetically rotating with a frequency which is an integral multiple of the frequency of the fundamental wave component of the motor current;
   a voltage command value generating device that generates 3-phase AC voltage command values by adding an output from said fundamental wave current control system and an output from said higher harmonic current control system;
   a power conversion device that converts a DC source voltage to a 3-phase AC voltage corresponding to the 3-phase AC voltage command values and outputs the 3-phase AC voltage to the 3-phase AC motor;
   a voltage saturation detection device which detects that an output voltage from said power conversion device is in a saturated state; and a gain adjustment device that reduces a current control gain for said higher harmonic current control system if said voltage saturation detection device detects an output voltage-saturated state.

2. A motor control apparatus according to claim 1, wherein:
said voltage saturation detection device judges that an output voltage from said power conversion device is in a saturated state when the 3-phase AC motor is operating in a preset high-output operating range.

3. A motor control apparatus according to claim 1, wherein:
said voltage saturation detection device judges that an output voltage from said power conversion device is in a saturated state if any of the 3-phase AC voltage command values exceeds a judging reference value.

4. A motor control apparatus according to claim 1, wherein:
said voltage saturation detection device calculates an amplitude of an output voltage from said power conversion device based upon the output from said fundamental wave current control system and the output from said higher harmonic current control system and judges that an output voltage from said power conversion device is in a saturated state if the amplitude of an output voltage exceeds a judging reference value.

5. A motor control apparatus according to claim 1, wherein:
said gain adjustment device sets the output of said higher harmonic current control system to 0 if said voltage saturation detection device detects an output voltage-saturated state.

6. A motor control apparatus according to claim 1, wherein:
said high harmonic current control system implements proportional integral control on a deviation of a higher harmonic actual current relative to a higher harmonic current command value; and
said gain adjustment device reduces an integral control gain for said higher harmonic current control system if said voltage saturation detection device detects an output voltage-saturated state.

7. A motor control apparatus according to claim 1, wherein:
said gain adjustment device continuously reduces a current control gain over a predetermined length of time when an output voltage-saturated state is no longer detected by said voltage saturation detection device.

8. A motor control apparatus comprising:
a fundamental wave current control system that controls a fundamental wave component of a motor current in an orthogonal coordinate system which hypothetically rotates in synchronization with a rotation of a 3-phase AC motor;
a higher harmonic current control system that controls a higher harmonic component contained in the motor current in an orthogonal coordinate system hypothetically rotating with a frequency which is an integral multiple of the frequency of the fundamental wave component of the motor current;
a voltage command value generation means for generating 3-phase AC voltage command values by adding an output from said fundamental wave current control system and an output from said higher harmonic current control system;
a power conversion means for converting a DC source voltage to 3-phase AC voltage corresponding to the 3-phase AC voltage command values and outputs the 3-phase AC voltage to the 3-phase AC motor;
a voltage saturation detection means for detecting that an output voltage from said power conversion means is in a saturated state; and
a gain adjustment means for reducing a current control gain for said higher harmonic current control system if said voltage saturation detection means detects that an output voltage is in a saturated state.

9. A motor control method adopted in a control system having a fundamental wave current control system that controls a fundamental wave component of motor currents in an orthogonal coordinate system hypothetically rotating in synchronization with the rotation of a 3-phase AC motor and a higher harmonic current control system that controls a higher harmonic component contained in the motor currents with an orthogonal coordinate system hypothetically rotating with a frequency which is an integral multiple of the frequency of the fundamental wave component of the motor currents, in said control system 3-phase AC voltage command values is generated by adding an output from said fundamental wave current control system and an output from said higher harmonic current control system, a DC source voltage is converted to 3-phase AC voltages corresponding to the 3-phase AC voltage command values and the 3-phase AC voltages is outputted to the 3-phase AC motor, comprising:
detecting whether or not the 3-phase AC voltages converted from the DC source voltage and output to the 3-phase AC motor are in a saturated state; and
reducing a current control gain for said higher harmonic current control system if an output voltage saturated state is detected.

* * * * *